(12) United States Patent
Gouache et al.

(10) Patent No.: US 10,015,225 B2
(45) Date of Patent: Jul. 3, 2018

(54) METHOD FOR DYNAMIC ADAPTATION OF THE RECEPTION BITRATE AND ASSOCIATED RECEIVER

(75) Inventors: Stephane Gouache, Cesson Sevigne (FR); Yvon Legallais, Rennes (FR); Philippe Gilberton, Geveze (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 454 days.

(21) Appl. No.: 14/117,973

(22) PCT Filed: May 4, 2012

(86) PCT No.: PCT/EP2012/058187
§ 371 (c)(1),
(2), (4) Date: Feb. 18, 2014

(87) PCT Pub. No.: WO2012/156211
PCT Pub. Date: Nov. 22, 2012

(65) Prior Publication Data
US 2014/0189142 A1    Jul. 3, 2014

(30) Foreign Application Priority Data
May 18, 2011    (FR) ...................... 11 54334

(51) Int. Cl.
*H04N 21/236*    (2011.01)
*H04L 29/06*    (2006.01)
(Continued)

(52) U.S. Cl.
CPC ........ *H04L 65/608* (2013.01); *H04L 41/5019* (2013.01); *H04L 41/5051* (2013.01);
(Continued)

(58) Field of Classification Search
CPC ............... H04L 65/4084; H04L 65/608; H04L 41/5051; H04L 41/5019; H04L 45/3065;
(Continued)

(56) References Cited

U.S. PATENT DOCUMENTS 7,558,869 B2 *   7/2009   Leon ................. H04L 29/06027
                                                              370/235
8,341,255 B2 *  12/2012   Gopalakrishnan .. H04L 65/4084
                                                              709/200

(Continued)

FOREIGN PATENT DOCUMENTS

CN    101848205    9/2010
JP    2002152274    5/2002
(Continued)

OTHER PUBLICATIONS

Search Report Dated Sep. 19, 2012.
(Continued)

*Primary Examiner* — Patrice L Winder
*Assistant Examiner* — Ruth Solomon
(74) *Attorney, Agent, or Firm* — Jerome G. Schaefer

(57) ABSTRACT

The invention discloses a method for reception of an audio-visual program transmitted via portions over a network, the method using a real-time transport protocol and a real-time control protocol between a server and a receiver, the audio-visual program being available on the server in a plurality of versions corresponding to the program coded in different resolutions and enabling its transmission at different bitrates according to requests of the receiver. The method comprising a regular measurement of the bandwidth of the network by the receiver in order to adjust the transmission bitrate according to the state of the network.

17 Claims, 8 Drawing Sheets

(51) Int. Cl.
  *H04L 12/24* (2006.01)
  *H04L 12/725* (2013.01)
  *H04L 12/927* (2013.01)
  *H04N 21/2343* (2011.01)
  *H04N 21/442* (2011.01)
  *H04N 21/472* (2011.01)
  *H04N 21/6373* (2011.01)
  *H04N 21/6379* (2011.01)

(52) U.S. Cl.
  CPC ........ *H04L 45/3065* (2013.01); *H04L 47/801* (2013.01); *H04L 65/4084* (2013.01); *H04L 65/4092* (2013.01); *H04L 65/607* (2013.01); *H04L 65/80* (2013.01); *H04N 21/23439* (2013.01); *H04N 21/44209* (2013.01); *H04N 21/47202* (2013.01); *H04N 21/6373* (2013.01); *H04N 21/6379* (2013.01)

(58) Field of Classification Search
  CPC ...... H04L 47/801; H04L 47/10–47/127; H04L 49/206; H04L 65/00; H04L 65/607; H04N 21/2387
  USPC .................................................. 709/231, 203
  See application file for complete search history.

(56) References Cited

U.S. PATENT DOCUMENTS

| | | | | |
|---|---|---|---|---|
| 8,346,959 | B2* | 1/2013 | Deshpande | G06F 15/16 709/228 |
| 2004/0193762 | A1* | 9/2004 | Leon | H04L 29/06027 710/52 |
| 2005/0262257 | A1 | 11/2005 | Major et al. | |
| 2009/0089445 | A1* | 4/2009 | Deshpande | G06F 15/16 709/231 |
| 2009/0259756 | A1* | 10/2009 | Karlsson | H04L 47/10 709/228 |
| 2009/0282158 | A1* | 11/2009 | Courtemanche | H04N 21/4384 709/231 |
| 2010/0121974 | A1 | 5/2010 | Einarsson et al. | |
| 2010/0161716 | A1* | 6/2010 | Kajos | H04N 21/2221 709/203 |
| 2010/0235472 | A1* | 9/2010 | Sood | H04L 65/4092 709/219 |
| 2011/0082924 | A1* | 4/2011 | Gopalakrishnan | H04L 65/4084 709/223 |
| 2011/0082945 | A1* | 4/2011 | Myers | H04N 21/234327 709/231 |
| 2011/0082946 | A1* | 4/2011 | Gopalakrishnan | H04L 65/4084 709/231 |
| 2011/0307545 | A1* | 12/2011 | Bouazizi | H04N 21/234345 709/203 |
| 2012/0170642 | A1* | 7/2012 | Braness | G11B 27/005 375/240.01 |
| 2013/0290493 | A1* | 10/2013 | Oyman | H04W 72/0413 709/219 |

FOREIGN PATENT DOCUMENTS

| | | |
|---|---|---|
| JP | 2007036666 | 2/2007 |
| JP | 2008029006 | 2/2008 |
| JP | 2010021663 | 1/2010 |
| JP | 2010503280 | 1/2010 |
| JP | 2010136395 | 6/2010 |
| JP | 201187103 | 4/2011 |

OTHER PUBLICATIONS

Mehrotra et al: "Rate-distortion optimized client side rate control for adaptive media streaming", IEEE International Workshop on Multimedia Signal Processing (MMSP Jan. 1, 2009).
Kim et al: "Probing-based channel adaptive video streaming for wireless 3G network", IEICE Transactions on Communications, pp. 357-363, Feb. 1, 2006.
Sodagar, Iraj, "White paper on MPEG-DASH Standard, MPEG-DASH: The Standard for Multimedia Streaming Over Internet", Communication Group, Apr. 2012.
Cardwell, Neal et al, "BBR Congestion-Based Congestron Control", acmqueue, Sep.-Oct. 2016, pp. 20-53.

* cited by examiner

METHOD FOR DYNAMIC ADAPTATION OF THE RECEPTION BITRATE AND ASSOCIATED RECEIVER

This application claims the benefit, under 35 U.S.C. § 365 of International Application PCT/EP12/058187, filed May 4, 2012, which was published in accordance with PCT Article 21(2) on Nov. 22, 2012 and which claims the benefit of French patent application No. 1154334 filed May 18, 2011

1. DOMAIN OF THE INVENTION

The invention relates to the domain of audiovisual programme receivers and more specifically to the dynamic adaptation of the programme according to the bandwidth available on the network during the transmission of a programme using a real-time transmission protocol and a real-time server control protocol associated with the real-time transmission protocol for a transmission in streaming.

2. PRIOR ART

The downloading of a programme for its display imposes the complete transfer of the audiovisual programme to the receiver before recovery. In order to avoid the associated constraints, such as the requirement to wait for the end of the downloading or needing to have sufficient storage space for the entire programme, the use of streaming (continuous transmission of the programme during viewing) is widely prevalent.

Known streaming protocols include RTP (RFC3550 and RFC associated according to the format of transported data), associated with the server control protocol (RFC2326) and MPEG TS/UDP (Motion Picture Expert Group Transport Stream/User Datagram Protocol) while the download generally uses the HTTP (Hyper Text Transfer Protocol) protocol.

Modern communication networks offer bandwidth capacities that enable the transmission of audiovisual programmes in streaming. The transmission can be carried out via networks such as the Internet, between a server and a client. Streaming is a transmission method in which the audiovisual programme transmitted is broken down into temporal portions (successive portions to be rendered sequentially) successively transmitted on the network throughout the transmission and recovery. The transmission and recovery are simultaneous, with the addition of a slight lag due to the use of a buffer memory on the receiver.

The standard 3GPP (3GPP, TSGS-SA, Transparent end-to-end packet switched streaming service (PSS), 3GPP file format (3GP), TS 26.244, V6.3.0, 2005-03) defines a format for organisation of data and storage comprising several versions of a same programme corresponding to different bitrates. This format, associated with a control logic on a programme server, enables adaptation to the conditions and particularly to variations in bandwidth related to network use. This control logic implemented on the server is not however specified in the 3GPP standard.

In the 3GPP format data are coded to conform to a bitrate constraint on a transmission link for a fixed bitrate: when the data is images, the coding consists in adapting the resolution of images to enable their transport on a link with more or less bandwidth. But 3GPP however does not define switching means enabling the resolution of transmitted images to be modified in order to adjust the reception of data to the variations in bandwidth. Some methods are known to resolve this problem: they depend on data transmitted from the client to the server, such as the RRs (Receiver Reports) defined in the RTCP (Real-Time Control Protocol) protocol and that require steps for processing and interpretation by the server in order to define whether the transmission should be carried out at another bitrate.

HTTP streaming technology was recently brought to the attention of the general public via Apple for their iPhone and via Microsoft for their Smoothstreaming. HTTP streaming technology is only used in IPTV receivers for which the functioning relies on RTP and RTSP protocols.

The transmission methods used today in IPTV do not allow dynamic adaptation of the bitrate according to the bandwidth available on the network without use of a specific server Also, when the access conditions to the server deteriorate, a risk of interruption to the service occurs at the receiver.

The real-time transfer protocol RTP, for example, is a protocol used for the encapsulation and real-time transmission of data coding an audiovisual programme. The coding used for the data is generally of MPEG-TS type or an equivalent format.

RTSP is an example of communication protocol enabling the control of a remote media server. Such a protocol offers the functionalities typical of a video player, such as "PLAY" and "PAUSE" and enables the playing of a portion of the audiovisual programme from the temporal position of the programme portion in the programme (in example, a time index or a corresponding position in a file).

During transmissions of audiovisual programmes in streaming using the protocols such as RTP and RTSP, for example, significant modifications in network availability have a very significant incidence on the recovery of programmes. When the bit-rate not is dynamically adjusted between the start and the end of a transmission, interruptions occur, which is a significant inconvenience for the user.

The RTP transport protocol relies on the UDP protocol and the HTTP protocol relies on the connected TCP protocol.

TCP is known as a "connected" protocol that responds to reliability constraints, it enables data to be transmitted without packet errors from a server to a receiver. To do this, the receiver communicates with the server indicating to it the data received. In addition to being dependent on lost and retransmitted data, the average bitrate is linked to the routing of acknowledgements. The faster the routing time the more the maximum bitrate is reduced.

UDP is a protocol that does not respond to the same reliability constraints. It is called "non-reliable" and "without connection". It has no acknowledgement system and its average bitrate is not linked to the distance between the server and the receiver. It is for this reason that the UDP protocol is used with RTP in IPTV applications.

One of the purposes of the invention is to combine the advantages of UDP while being able to dynamically adapt the bitrate to the network conditions.

3. SUMMARY OF THE INVENTION

The purpose of the invention is to overcome at least one of the disadvantages of the prior art and more specifically to enable a dynamic control of the bandwidth used during a transmission of audiovisual programmes for standard IPTV infrastructures using some real-time transfer/control protocol such as, for example, the RTP and RTSP protocols.

A use of a real-time server control protocol adapted according to the invention enables the receiver to request from the server the transmission of the audiovisual programme in successive portions. The receiver periodically measures, for each of the transmitted portions, the transmission conditions of the network and adjusts the transmission bitrate as a consequence. The adjustment of the transmission bitrate is carried out by the receiver by selecting, for each portion of the programme successively requested from the server, a programme version from among several versions coded a different bitrates and available on the server. The selection of the version by the receiver is made according to the transmission bitrate measured during the transmission of the preceding portion. In this way, the adjustment of the bitrate does not require modification of the programmes server.

The invention relates to a method for reception of an audiovisual programme stored on a server for playing on a display device connected to a receiver, the audiovisual programme being available on the server in at least two versions, each of the versions comprising a temporal succession of blocks of data coding parts of the programme (and thus a succession of block of data to be sequentially rendered), the versions each comprising a same number of blocks, the blocks each beginning with an image coded without reference to a previous image. According to the invention, the method comprises steps, at the level of the receiver, of reception, according to a real-time transport protocol, of a first portion of the audiovisual programme comprising at least one block of data from a first of the versions transmitted by the server at a first bitrate, of determination of the bandwidth after reception of the first portion of the audiovisual programme transmitted by said server at the first bitrate, of transmission of a request to the server, according to a real-time server control protocol, the request comprising identification information of a second portion of the audiovisual programme in one of the versions of the programme according to the determined value of the bandwidth between the server and the receiver and a transmission speed parameter, the identification information comprising temporal markers of the start and finish of the second portion.

According to an embodiment of the invention, the steps of reception, determination of the bandwidth and transmission of a request by the receiver are reproduced iteratively during the reception of the audiovisual programme.

According to an embodiment of the invention, the versions of the audiovisual programme are comprised in a single file stored on the server.

According to an embodiment of the invention, the audiovisual programme is associated on the server with a descriptive file comprising information relating to the localisation of versions of the audiovisual programme in the same file.

According to an embodiment of the invention, the determination of the available bandwidth between the server and the receiver comprises an analysis of the at least one characteristic of portions of the audiovisual programme received at the first bitrate.

According to an embodiment of the invention, at least one characteristic of portions is the number of bits transmitted.

According to an embodiment of the invention, the step of transmission of a request uses the command PLAY of the RTSP protocol.

The invention also relates to a reception device for an audiovisual programme diffused by a server, the programme being available on the server in at least two versions, each of these versions corresponding to an image resolution of the audiovisual programme and comprising a succession of portions, the versions each comprising a same number of portions and the portions each beginning with an intra image. According to the invention, the device comprises means for reception, according to a real-time transport protocol, of a first portion of the audiovisual programme in a first of the versions transmitted by said server at a first bitrate, means for determination of the bandwidth after reception of the first portion of said audiovisual programme transmitted by said server at the first bitrate and means for transmission of a request to the server, according to a real-control protocol, the request comprising identification information of a second portion of the audiovisual programme in one of the versions of the programme according to the determined value of the bandwidth between the server and the receiver and a transmission speed parameter, the identification information comprising temporal markers of the start and finish of the second portion.

The transmission bitrate is thus adjusted to adapt to the bandwidth available on the network and to avoid interruptions during the recovery of the audiovisual programme, even if it means recovering the programme with a lower level of quality.

Obviously, the invention is not limited to the use of RTP and RTSP protocols and concerns any real-time transfer protocol and corresponding server control protocol having similar features than respectively RTP and RTSP, and particularly providing control commands such as a PLAY command with parameters allowing to select a version, a start time and a length (or a stop time) for the part of the audiovisual programme to be played (rendered).

4. LIST OF FIGURES

The invention will be better understood, and other specific features and advantages will emerge upon reading the following description, the description making reference to the annexed drawings wherein.

Figure 4:
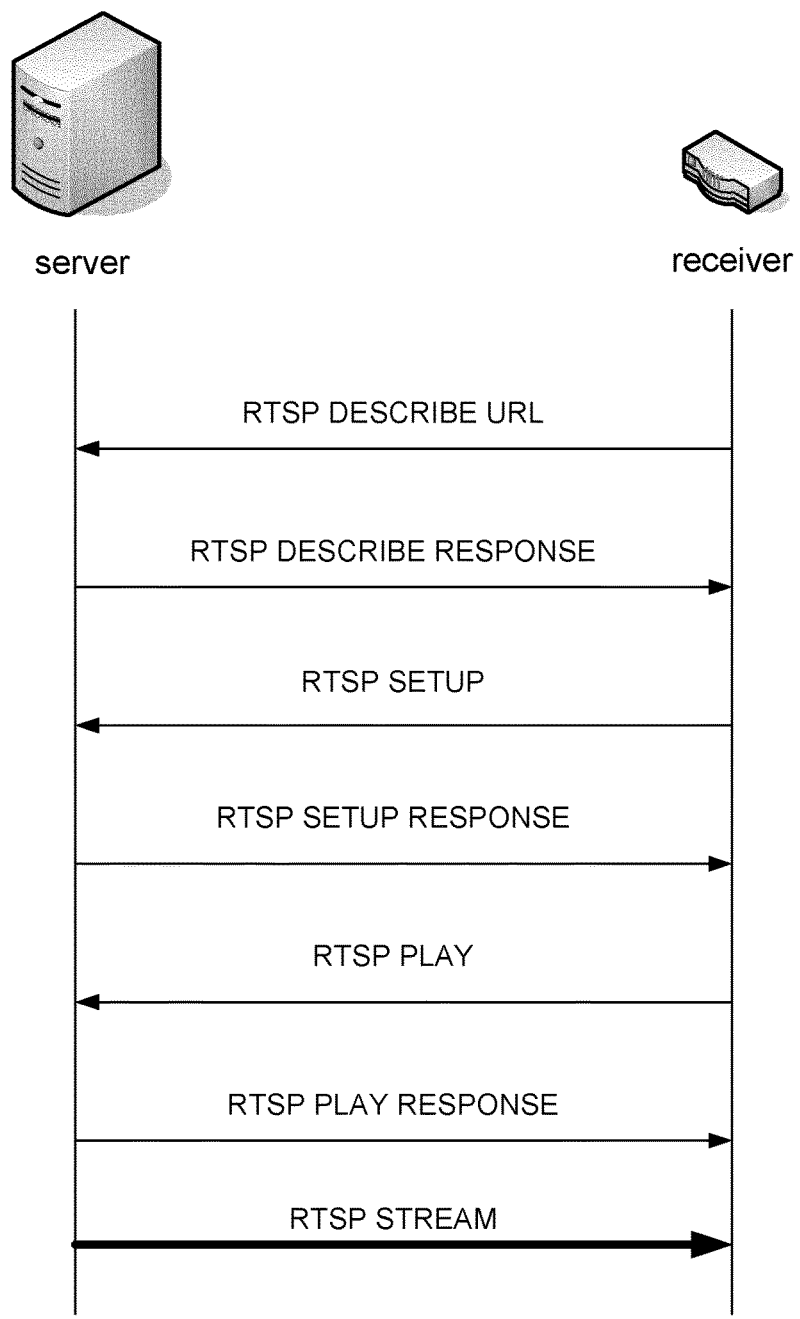

FIG. 4 diagrammatically shows a sequence of initialisation messages between a receiver and a server for transmission of a stream according to the RTP transmission protocol.

Figure 5:
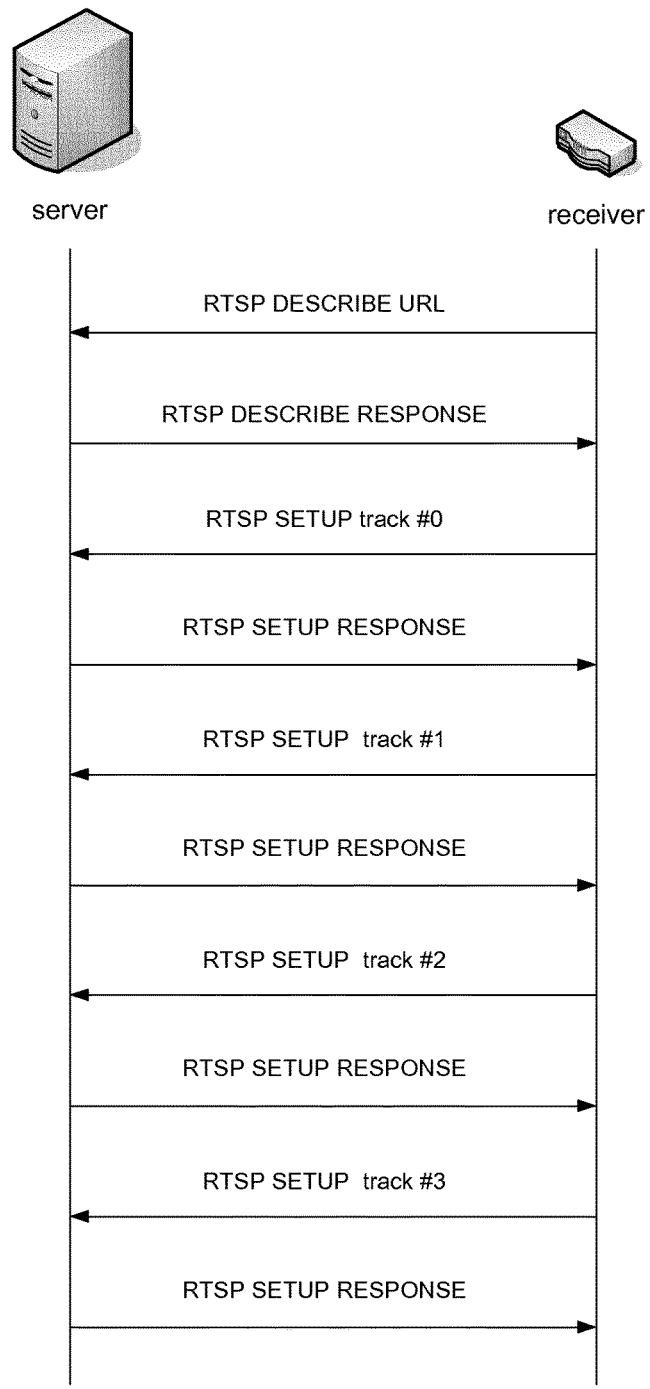

FIG. 5 shows a sequence of initialisation messages between a receiver and a server for transmission of a stream according to an embodiment of the invention.

Figure 6:
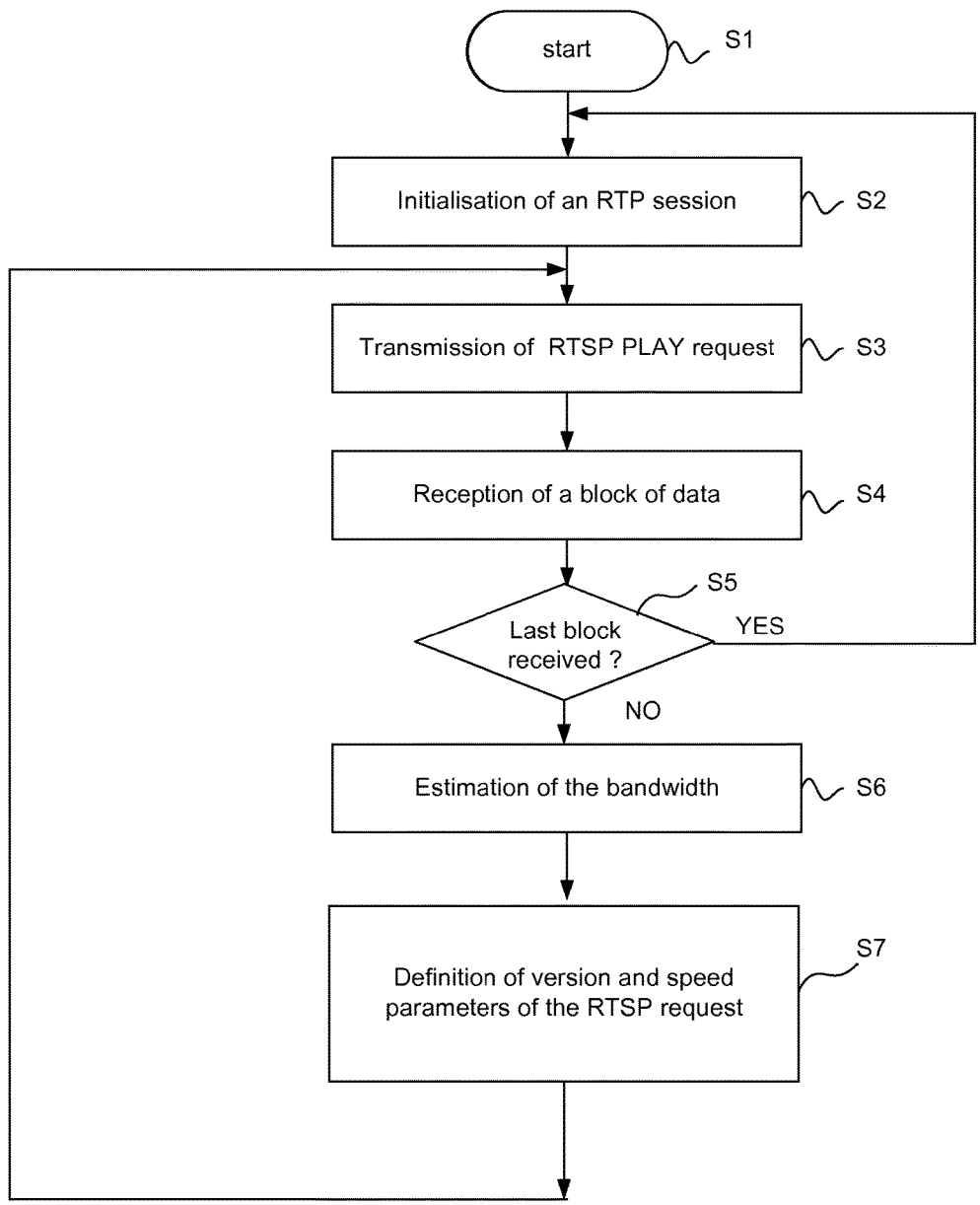

FIG. 6 is a diagram that shows the method implemented in a receiver, comprising a regular evaluation of the bandwidth of the network and the transmission of requests comprising a bitrate parameter and a transmission speed parameter adapted to the state of the network.

Figure 7:
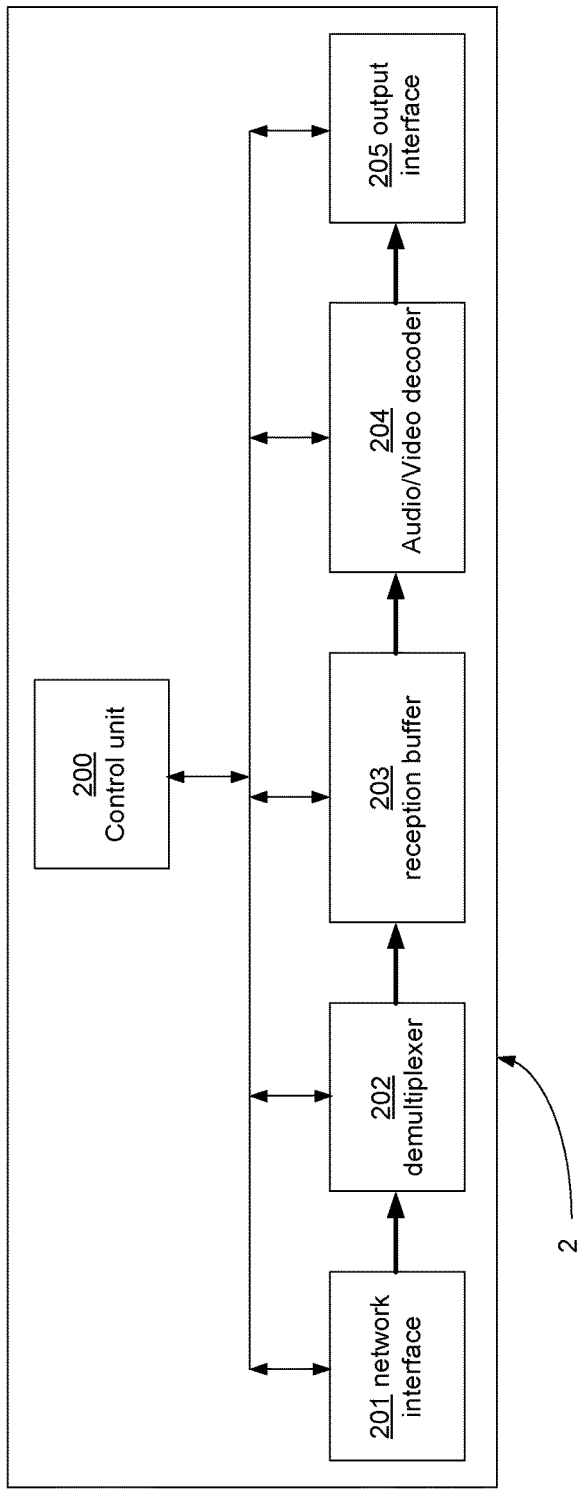

FIG. 7 is a functional diagram of a receiver according to an embodiment of the invention.

Figure 8:
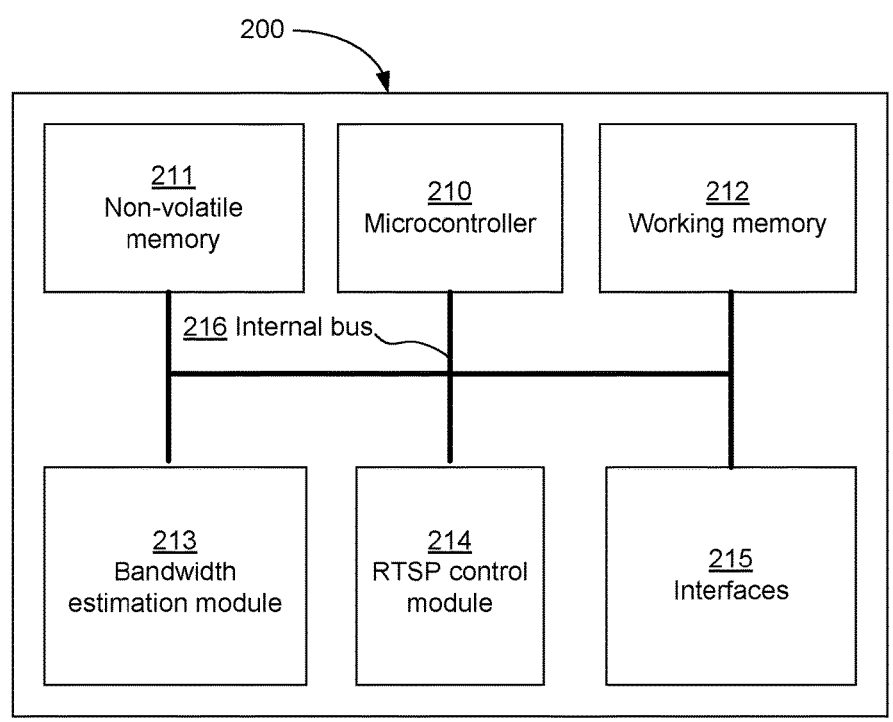

FIG. 8 is a functional diagram showing the control unit of the receiver described in FIG. 7.

5. DETAILED DESCRIPTION OF THE INVENTION

In a general but not limited manner, the invention relates to a method for reception of an audiovisual programme in streaming, enabling a dynamic adaptation of the bitrate used for the transmission of the programme according to the congestion of the network determined by a regular measurement of the bandwidth.

Figure 1:
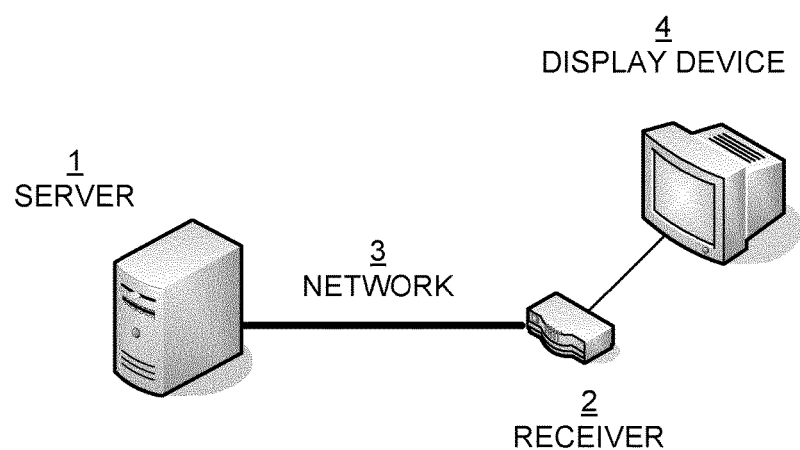
FIG. 1 shows a system for reception of audiovisual programmes by means of a receiver/decoder according to an embodiment of the invention.

FIG. 1 shows a system for reception of audiovisual programmes by a receiver 2 via a network 3. During the reception, the receiver processes the audiovisual programme and transmits signals to the display device 4 for its display. The programmes are coded and available on the programmes server 1. The programmes are stored in the form of digital files. The transmission techniques authorizing the transmission of programmes at variable bitrates during recovery require a specific coding in order to make available on the server the audiovisual programme in different versions corresponding to different bitrates during the transmission of data that code the programme. The different versions of the same audiovisual programme are stored on the programme server 1. The different versions can be stored in distinct files or brought together on a single file and identified by their respective positions in the file. A description file associated with each of the programmes contains information relative to the different versions, their respective bitrates and their locations. This information is transmitted to the receiver during an initialisation phase of the programme transmission from the server to the receiver.

Figure 2:
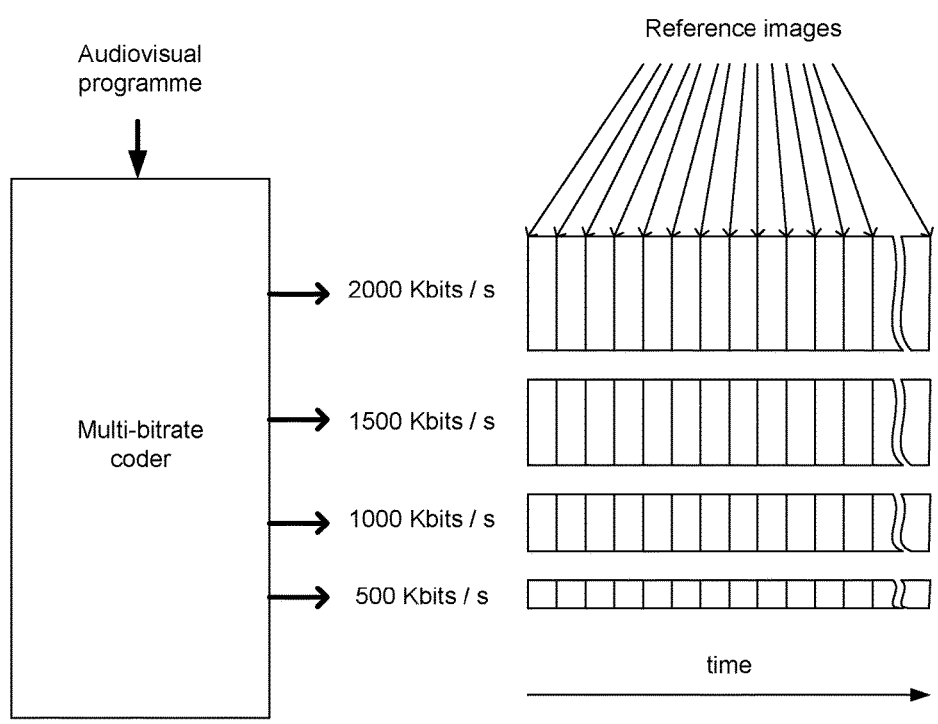
FIG. 2 shows a method for coding enabling the creation of a file containing several versions of a same programme.

FIG. 2 shows the coding of an audiovisual programme in order to be transmitted with a bitrate adjustment according to the transmission conditions on the network. The audiovisual programme is coded into several versions. Each of the versions corresponds to an image resolution and thus to a transmission bitrate. In each of the versions the programme is constituted of a succession of blocks or image groups. All of the blocks correspond to an elementary recovery (or play) duration of the programme, for example 2 seconds. These elementary blocks are commonly called chunks, for example in the case of HTTP Adaptive streaming technology. The first image of each of the blocks is an intra image. An intra image is defined as being coded without reference to a preceding image. The position of intra images at the start of the block is the same in each of the versions. Thus, if a receiver requests of the server to deliver the next block in the continuity of the programme in terms of viewed content, but in another version and thus with another transmission bitrate, the decoder integrated in the receiver can carry out the decoding of the block without reference problems to previous images. FIG. 2 describes coding a programme in 4 versions corresponding respectively to bitrates in reception (and thus in transmission) of 500 Kbits/s, 1 Mbits/s, 1.5 Mbit/s and 2 Mbit/s.

Figure 3:
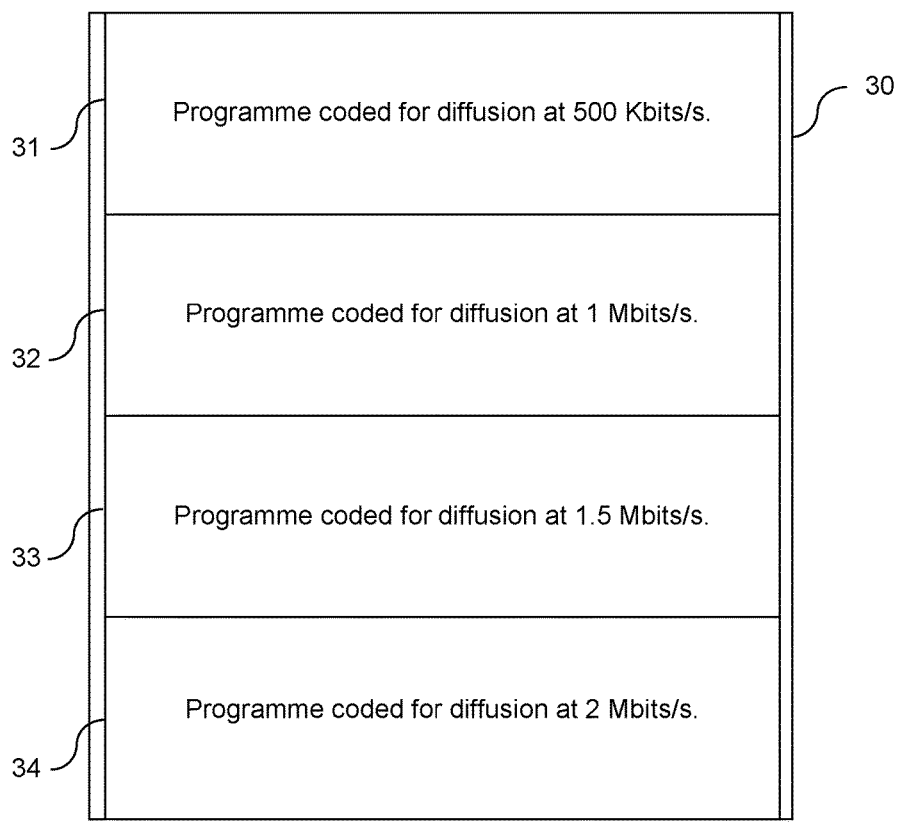
FIG. 3 shows a file of the server comprising several versions of a same audiovisual programme coded to be diffused at different bitrates according to an embodiment of the invention.

FIG. 3 shows a file 30 containing several versions 31, 32, 33, 34 of a same audiovisual programme as from, for example, a coding method shown in FIG. 2. The different versions are placed in a same file with different indexes. The passage from one version to the other during transmission of a programme thus corresponds to the addition of an index to the play pointer. A version of the audiovisual programme corresponds to each of the possible index values added to the pointer. The pointer identifies the temporal position of the portion of the programme to be recovered.

FIG. 4 shows the establishment of communication between a receiver and a diffusion server according to an embodiment of the invention using the RTP transmission Standard. During the initialisation of a diffusion that uses the RTP protocol, the receiver addresses a first message titled RTSP DESCRIBE including an uri to the server in order to obtain from the server information relating to the program that will be viewed on a display device connected to the receiver. The term uri (uniform resource locator) describes here the network address that points to the programme to be viewed. This address has for example the syntax "multimedia. exemple.com". The server addresses information to the receiver in a response message titled RTSP DESCRIBE RESPONSE. The message RTSP DESCRIBE RESPONSE indicates to the receiver if the programme versions are stored on the server in separate files or are concatenated into a single file. A second request titled RTSP SETUP is then addressed to the server via the receiver in order to prepare the streaming session of the programme. If the different versions of the programme are stored in separate files on the server, the receiver will then initialise with the server as many transmission sessions as there are available versions. If the different versions are concatenated in a same file on the server, the receiver initiates a single transmission session. In the case where the different versions of the programme are concatenated in a same file, the receiver will add an index to the play pointer to move from one version to another of the programme and thus adjust the transmission bitrate of the played programme portion. For each initialisation request of a session by the receiver, the server responds by a message titled RTSP SETUP RESPONSE. A third message titled RTSP PLAY sent by the receiver starts the transmission of the programme by the server. The message RTSP PLAY is still called a request and comprises a temporal marker parameter of the portion of the programme to be transmitted with a view to its recovery. The PLAY message also comprises a speed parameter indicating to the server the speed at which to transmit the data that correspond to the programme portion to be transmitted.

According to an embodiment of the invention, the content of the audiovisual programme is coded according to H.264 codecs for the video and AAC codecs for the audio, the size of a block of elementary data beginning with an intra image corresponds to 2 seconds duration at the recovery, the encapsulation of data is done according to an MPEG transport stream format, and the bitrates associated with the different versions are 500 Kbits/sec, 1 Mbits/sec, 1.5 Mbit/sec and 2 Mbits/sec. The description file associated on the server with the audiovisual programme content file and containing information on different versions of the programme and on the different associated bitrates is an SDP format file that has for example the following form:

v=0
o=-1 1 IN IP4 192.168.1.33
s=Example of multimedia stream
b=RR:0
a=X-keyframe-period=2
a=control:*
a=range:npt=0-300
m=video 0 RTP/AVP 33
b=TIAS:500000
a=control:trackID=0
m=video 0 RTP/AVP 33
b=TIAS:1000000
a=control:trackID=1
m=video 0 RTP/AVP 33
b=TIAS:1500000
a=control:trackID=2
m=video 0 RTP/AVP 33
b=TIAS:2000000
a=control:trackID=3

In this SDP file example, the four streams (MPEG transport streams) are noted and associated with their respective bitrates by use of the parameter b=TIAS that corresponds to a bitrate expressed in Mbit/s.

FIG. 5 shows the establishment of communication between a receiver and a diffusion server according to an embodiment of the invention and when different versions of the programme to be viewed are stored in distinct files on the server. The receiver initialises the reception of audiovisual programme portion to be recovered from different streams. During the restitution, and for each programme portion successively requested, the receiver indicates on the server the version adapted to the bandwidth condition on the network and receives the data of the corresponding stream. Each stream corresponds to the transmission of data from a same version. According to an embodiment, the receiver addresses as many initialisation messages as there are versions available, prior to the transmission.

Once the initialisation phase (SETUP) has been completed for each of the versions, the receiver can pass from one version to another by sending a PLAY request specifying the version and temporal interval (by using temporal markers) corresponding to the required block, as well as to the transmission speed. According to other embodiments, the receiver can address SETUP initialisation requests before the first access to a version, during transmission.

FIG. 6 is a block diagram that shows the method used by the receiver, according to an embodiment of the invention. Step S1 is the initial step at which the receiver has not initialised reception of a programme in streaming. At this step, the receiver is on standby for a command from a user controlling the receiver. At step S2, the receiver initialises a streaming diffusion session. It sends a first RTSP DESCRIBE message specifying the target url address of the audiovisual programme to be received from the server for restitution. This url address can be for example rtsp:// exemple.com/movie/. This target address serves as a reference for the control of the diffusion. The server addresses a RTSP DESCRIBE RESPONSE type message that indicate to the receiver the transmission stream properties corresponding to the different versions of the audiovisual programme, coded to be diffused at different bitrates. This information comprises the number of versions, their respective identifiers, the coding bitrates and the size of blocks of data. The following message exchanges, RTSP SETUP transmitted from the receiver and RTSP SETUP RESPONSE transmitted from the server, prepare the streaming diffusion session. The receiver stores the information received in the initialisation phase S2 and is able to address successive RTSP PLAY requests for the diffusion and the reception of portions (comprising one or several blocks of data) of the audiovisual programme. At step S3, the receiver transmits a RTSP PLAY request that contains parameters specific to the diffusion of the portion of programmes to be received (and thus to be diffused by the server).

The structure of a RTSP PLAY request according to an embodiment of the invention is:
PLAY rtsp://multimedia.exemple.com/stream/trackID=1 RTSP/1.0
  Cseq: 833
  Range: npt=0-2
  Speed: 1

Where PLAY indicates that the request is a message requesting the diffusion of a block of data with a view to its restitution.

Cseq indicates the sequence number indicated by the server at the initialisation step S2, Range indicates the programme portion corresponding to the temporal position from 0 to 2 seconds from the start of the diffusion and Speed indicates the diffusion speed.

In order to avoid interruptions during the restitution of the audiovisual programme, the receiver addresses the RTSP PLAY requests for the next programme portion in anticipation in order to maintain a sufficient quantity of data in the reception buffer. Preferentially, the reception buffer contains 2 seconds of programme received and available before decoding. Advantageously, and to absorb fluctuations in available bandwidth on the network, the reception buffer can contain a number of items of data corresponding to several seconds of restitution of the transmitted audiovisual programme.

According to an embodiment of the invention and for the purposes of simplification, the diffusion of data blocks from different versions is done during a single RTSP session. It is thus advantageous to concatenate the different versions of the programme coded in a single file on the server.

If it is considered that an audiovisual programme of a duration d coded with the bitrate B0=500 Kbps, B1=1 Mbps, B2=1.5 Mbps and B3=2 Mbps, the access to the $i^{st}$ version of the programme coded at the bitrate $B_i$ from the temporal position t, the Range parameter of the corresponding RTSP PLAY request will be defined in the following way:

$$Range = i \times d + t$$

At step S4, the receiver receives the data block coding the portion of the programme targeted on the server. The receiver stores this block of data in the reception buffer where it will be read by the audio/video decoding module of the receiver.

Step S5 defines if the portion previously received in S4 was the last of the programme, if this is the case the diffusion ends.

In step S6 and in the case where the portion of data received in S4 is not the last of the audiovisual programme, in terms of temporal position, the receiver carries out an estimation of the available bandwidth on the network.

The estimation of bandwidth comprises, according to an embodiment of the invention, steps for definition of the diffusion bitrate possible from the server and steps for measurement of the bitrate over a predefined period. Advantageously, the estimation of the bandwidth can comprise a weighting step. According to an embodiment of the invention, the step of weighting comprises a step of smoothing or integration that enables and average value to be obtained overcoming rapid variations in the bandwidth around this value. The receiver comprises a buffer memory (reception buffer) able to absorb rapid variations in the network bandwidth.

According to the invention, the estimation of the bandwidth can be repeated for each of the elementary blocks of data or for the portion of the programme comprising a predefined number of elementary blocks of data.

According to an embodiment of the invention, the receiver uses information transmitted by the server in response to the RTSP PLAY request to carry out the bandwidth estimation.

The response transmitted by the server to an RTSP PLAY request has the following form:
RTSP/1.0 200 OK
  Cseq: 834
  Range: npt=0-2
  RTP-Info: url=rtsp://multimedia.exemple.com/stream/trackID=1;
    seq=45102; rtptime=12345678

Where rtptime is a temporal marker indicating the start of the portion of the programme indicated by the interval npt.

If for example a clock programme is considered of a stream coded in MPEG-2 TS format having a value of 9000, communicated to the receiver at the initialisation step of the transmission session, the receiver can calculate a time interval rangeduration corresponding to the reception time of the block of data:

rangeduration=rtptime end−rtptime start

Where rtptime start is the value of the parameter rtptime indicated in the information field RTP-Info of the server response, and rtptime end=rtptime of the field RTP-Info+ 90000

Where 90000 is the clock RTP indicated during the phase initialisation of the diffusion session.

The instantaneous bitrate over the reception period of the block of data is then calculated by adding the number of bytes of data received over the time interval (bytes that constitute the packets of data of the diffusion according to the RTP protocol), multiplying the number of bytes by 8 to obtain the number of bits (binary elements) and dividing the result of the product by the reception duration.

Namely an expression of the instantaneous bitrate:

$B_i$=Bytes×8/rangeduration

According to an embodiment of the invention, the value of the instantaneous bitrate thus calculated is then used in a smoothing algorithm to define a more precise bitrate value.

The algorithm uses an iterative process in order to determine the bitrate that could be attained considering the values of instantaneous bitrates calculated in the previous iterations:

i is an index that refers to the $i^{st}$ iteration of the calculation of useful bitrate and of its variance during the transmission of received data.

An estimation of future bitrate for the next iteration is calculated thus:

$avg_{i+1}=(1-\alpha)\times avg_i+\alpha\times B_i$ where $B_i$ is the measured bitrate,
$avg_i$ is the average calculated for the current iteration,
α is a weighting factor attributed to the measured value of instantaneous bitrate.

Preferentially, the value of α is equal to 1/16.

In addition to the weighted average value, the algorithm used by the invention estimates the variance on the bitrate. The variance is smoothed in the same way as the bitrate:

$\Delta_i=|B_i-avg_i|$ $var_{i+1}=(1-\beta)\times var_i+\beta\times\Delta_i$ where $\Delta_i$ is the difference between the measured bitrate and the average bitrate for the current iteration of the calculation,
$var_i$ is the variance calculated for the current iteration,
β is a weighting factor for the variance value of the current estimation.

Preferentially, the value of β is equal to 1/8.

For each of the iterations of the algorithm, the estimation of the bitrate that can be attained for the diffusion of the audiovisual programme is calculated as follows:

$B_i max=avg_i-4\times var_i$

Thus if the variance is great, this means that the receiver uses less than the average available bandwidth. Moreover, when the bandwidth is stable and the variance is low the receiver uses all of the bandwidth available between the server and itself.

Advantageously, in the case where the receiver uses all the available bandwidth, it addresses to the server RTSP PLAY requests aiming to group together several elementary portions of the programme received, this in order to avoid overloading the server with very regular requests. The receiver can for example request with the same request to the server two or four elementary blocks of data.

According to an embodiment of the invention, when the variance is too great, for example if its value is greater than half the value of the bitrate, the estimations of bitrate and variance are calculated as follows:

$avg_{i+1}=(avg_i+B_i)/2$ and $var_{i+1}=avg_{i+1}/10$

According to a variant of the invention, the receiver determines if the network allows the diffusion at a bitrate greater than the current bitrate by pointing on the same version of the audiovisual programme and modifying the speed parameter defined in the RTSP control protocol. If the current bitrate is for example 1.5 Mbits/s, the receiver evaluates the capacity of the network to transmit at 2 Mbits/s by sending a request to the server specifying a "Speed" parameter with the value Speed=1.34.

An RTSP request transmitted in order to receive the block of data corresponding to the time interval between the second and the fourth second of the audiovisual programme located via the url "multimedia.exemple.com/stream" has a bitrate of 2 Mbits/s while the current diffusion bitrate is 1.5 Mbits/sec has for example the following form:

PLAY rtsp://multimedia.exemple.com/stream/trackID=1 RTSP/1.0
Cseq: 833
Range: npt=2-4
Speed: 1.34

At step S7, the receiver defines the parameters of the request to address to the server taking into account the result of the calculation of the available bandwidth and the bandwidth variation. According to an embodiment of the invention, the receiver modifies the speed parameter of the RTSP request according to combinations of values calculated of the bandwidth and variance. For example, according to a variant of the invention and in the case of congestion of the network that can lead to not only a reduction in transmission speed, but also to the loss of data, the receiver carries out a new request in order to receive the data lost in a corresponding version at a lower bitrate and an increased transmission speed. The use of a lower bitrate and an increased transmission speed enables on one hand to reduce the quantity of data that transit between the server and the receiver, but also rapidly compensates for the loss of time resulting from the loss of data previously transmitted by the server. According to an embodiment of the invention, the receiver uses the sequence number of the header of the RTP packet that transports data in order to detect the loss of data during the transmission of a portion of the programme. The loss of data and the obligation to retransmit the data has the consequence of reducing the filling rate of the reception buffer and increasing the risk from artefacts linked to a loss of data in the buffer during the restitution of the programme. Advantageously, the receiver then addresses an RTSP PLAY request indicating a lower bitrate and a speed parameter greater than 1 before re-implementing the algorithm previously described.

FIG. 7 shows a reception device 2 adapted for the reception and display of an audiovisual programme according to an embodiment of the invention. A bi-directional network interface 201 enables the reception of data coding the audiovisual programme to be recovered. The interface 201 also enables the transmission and reception of control messages to and from the diffusion server. A demultiplexer 202 filters the data relating to the reception of a programme from the reception flux as well as control messages and stores them in a reception buffer 203. The data that code the audiovisual programme are read by the Audio/Video decoder 204 that decodes them and transmits the corresponding signals to the output interface 205. A display device (not shown) and connected to the output interface 205 enables the display of the programme for the user. The set of elements 201, 202, 203, 204 and 205 are controlled by the control unit 200 that contains according to an embodiment of the invention a micro-controller and associated memories enabling the execution of software routines as well as the processing of data. The control unit 200 analyses in addition the control messages in reception from the server and generates the control messages transmitted to the server.

FIG. 8 shows the control unit 200 according to an embodiment of the invention. The control unit comprises a microcontroller 210 responsible for the execution of software applications. The executable code of applications is stored in the non-volatile memory 211 at the start-up of the receiver 2 and can be copied into the working memory 212 when the receiver 2 is operational. The working memory 212 comprises a random access memory for the storage of data specific to the execution of software applications and the storage of data received. The control unit 200 also comprises a module for the estimation of bandwidth 213. The bandwidth estimation module 213 calculates the available bandwidth on the link between the server and the receiver 2 using data read from the reception buffer. The RTSP control module 214 composes the RTSP request according to the value of the bandwidth calculated and available in the estimation module 213. The RTSP control module reads the data that constitute the response to the RTSP PLAY request in the reception buffer and communicates the temporal marker rtptime to the estimation module 213. The data exchanged between the different modules of the control unit 200 transit via the internal bus 216. The set of data exchanges with the other functional modules of the receiver are carried out via the interface module 215.

The invention is described here with an embodiment based on the RTP and RTSP protocols, but the invention is obviously not limited to the use of RTP and RTSP protocols. The invention also concerns any real-time transfer protocol and corresponding server control protocol having similar features than respectively RTP and RTSP and particularly providing control commands such as a PLAY command with parameters allowing to define (select) a version, a start time and a length (or a stop time) for the part of the audiovisual programme to be played (rendered).

The invention claimed is:

1. A method, to be performed in a receiver device of a communication network, for a reception of an audiovisual programme stored, on a server of said communication network, in at least two versions, each of said versions having a different coding bit rate and comprising a succession of blocks of data representing respectively parts of said audiovisual programme to be successively rendered, said versions each comprising a same number of blocks, said blocks each beginning with an image coded without reference to a previous image, said method comprising:

determining an available bandwidth between said server and said receiver device after reception of a first portion of a first version of said audiovisual programme received at a first transmission speed, said first version corresponding to a first coding bitrate; and transmitting a real-time streaming protocol request for receiving a second portion of said audiovisual programme, said request for receiving said second portion including a second coding bitrate specifying a second of said versions and a second transmission speed, said requested second coding bit rate and said requested second transmission speed taking into account a value of the determined available bandwidth;

wherein, in case of congestion or packet loss, said second transmission speed is an increased transmission speed compared to said first transmission speed.

2. The method according to claim 1, wherein said method comprises receiving a message indicating properties of said versions, said message comprising said coding bitrates of said versions.

3. The method according to claim 1, wherein said first and said second portions group together several blocks of data.

4. The method according to claim 1, wherein said determining of an available bandwidth between said server and said receiver device takes into account an available bandwidth determined for at least one portion of said audiovisual programme received previously to said first portion.

5. The method according to claim 1, wherein said determining takes into account a reception duration of said first portion and a number of bits of said first portion.

6. The method of claim 1 wherein said method comprises, when said second coding bit rate is greater than said first coding bitrate, transmitting a request for receiving a third portion before transmitting said request for receiving said second portion, said request for receiving said third portion including said first coding bitrate specifying said first version and a third transmission speed greater than a first transmission speed that has been requested by said receiver device for said first portion and wherein said transmitting of said request for receiving said second portion is performed according to a capability of said network to transmit said third portion of said first version with said third transmission speed.

7. A communication network device for reception of an audiovisual programme stored, on a server of said communication network, in at least two versions, each of said versions having a different coding bit rate and comprising a succession of blocks of data representing respectively parts of said audiovisual programme to be successively rendered, said versions each comprising a same number of blocks, said blocks each beginning with an image coded without reference to a previous image, said communication network device comprising:

a control unit for determining an available bandwidth between said server and said communication network device after reception, by a network interface of said communication network device, of a first portion of a first version of said audiovisual programme received at a first transmission speed, said first version corresponding to a first coding bitrate;

a first network interface for transmitting a real-time streaming protocol request for receiving a second portion of said audiovisual programme, said request for receiving said second portion comprising a second coding bitrate specifying a second of said versions and a second transmission speed, said requested second coding bit rate and said requested second transmission speed taking into account a value of the determined available bandwidth;

wherein in case of congestion or packet loss said second transmission speed is an increased transmission speed compared to said first transmission speed.

8. The communication network device according to claim 7, wherein said network interface is configured for receiving a message indicating properties of said versions, said message comprising said coding bitrates of said versions.

9. The communication network device according to claim 7, wherein said first and said second portion groups together several blocks of data.

10. The communication network device according to claim 7, wherein said control unit for determining said available bandwidth between said server and said communication network device takes into account an available bandwidth determined for at least one portion of said audiovisual programme received previously to said first portion.

11. The communication network device according to claim 7, wherein said control unit for determining takes into account a reception duration of said first portion and a number of bits of said first portion.

12. The communication device of claim 7 wherein said first network interface is adapted for transmitting, when said second coding bit rate is greater than said first coding bitrate, a request for receiving a third portion before transmitting said request for receiving said second portion, said request for receiving said third portion including said first coding bitrate specifying said first version and a third transmission speed greater than a first transmission speed that has been requested for said first portion, and wherein said transmitting of said request for receiving said second portion is performed according to a capability of said network to transmit said third portion of said first version with said third transmission speed.

13. A server for diffusing in a communication network an audiovisual programme stored on said server in at least two versions, each of said versions having a different coding bit rate and comprising a succession of blocks of data representing respectively parts of said audiovisual programme to be successively rendered, said versions each comprising a same number of blocks, said blocks each beginning with an image coded without reference to a previous image, said server comprising:

a transmitter that transmits to a reception device a first portion of a first version of said audiovisual programme received at a first transmission speed, said first version corresponding to a first coding bitrate;

a receiver that receives a real-time streaming protocol request for receiving a second portion of said audiovisual programme, said request for receiving said second portion comprising a second coding bitrate specifying a second of said versions, and a second transmission speed, said requested second coding bit rate and said requested second transmission speed taking into account a value of an available bandwidth between said server and said reception device, said available bandwidth being determined by delivering of said first portion of said audiovisual programme to said reception device;

wherein, in case of congestion or packet loss, said second transmission speed is an increased transmission speed compared to said first transmission speed.

14. The server according to claim 13, wherein said transmitter addresses to said reception device a message indicating properties of said versions, said message comprising said coding bitrates of said versions.

15. The server according to claim 13, wherein said versions of said audiovisual programme are comprised in a same file stored on said server.

16. The server according to claim 15, wherein said audiovisual programme is associated on said server with a descriptive file comprising information relating to a localisation of said versions of said audiovisual programme in said same file.

17. The server according to claim 13, wherein said first and said second portions group together several blocks of data.

* * * * *